(12) United States Patent
Ross et al.

(10) Patent No.: US 10,811,961 B1
(45) Date of Patent: Oct. 20, 2020

(54) TOP-OFF CHARGE PUMP AND METHODS OF OPERATING SAME

(71) Applicant: Allegro MicroSystems, LLC, Manchester, NH (US)

(72) Inventors: Thomas Ross, West Lothian (GB); Aldo Togneri, Midlothian (GB); James McIntosh, East Lothian (GB); Gianluca Allegrini, Musselburgh (GB)

(73) Assignee: Allegro MicroSystems, LLC, Manchester, NH (US)

( * ) Notice: Subject to any disclaimer, the term of this patent is extended or adjusted under 35 U.S.C. 154(b) by 0 days.

(21) Appl. No.: 16/564,287

(22) Filed: Sep. 9, 2019

(51) Int. Cl.
*H02M 3/07* (2006.01)
*H02M 1/32* (2007.01)

(52) U.S. Cl.
CPC .............. *H02M 3/07* (2013.01); *H02M 1/32* (2013.01)

(58) Field of Classification Search
None
See application file for complete search history.

(56) References Cited

U.S. PATENT DOCUMENTS

| | | | |
|---|---|---|---|
| 4,438,346 A | * | 3/1984 | Chuang ............... G11C 11/4074 327/536 |
| 5,568,083 A | * | 10/1996 | Uchiyama ............... G05F 1/466 327/538 |
| 9,291,478 B2 | | 3/2016 | Contaldo et al. |
| 9,614,428 B2 | | 4/2017 | Garvey et al. |
| 9,641,070 B2 | * | 5/2017 | Wibben ................. H02M 3/156 |
| 10,367,500 B2 | | 7/2019 | Wibben |
| 10,483,846 B1 | * | 11/2019 | Allegrini ............... H02M 3/073 |
| 2009/0058507 A1 | * | 3/2009 | Nandi ...................... H02M 3/07 327/536 |
| 2013/0194031 A1 | * | 8/2013 | Poulton ............... H04L 25/0272 327/536 |
| 2014/0333348 A1 | * | 11/2014 | Cheng ..................... H02M 1/00 327/103 |
| 2017/0054363 A1 | | 2/2017 | Mangtani et al. |
| 2018/0138693 A1 | * | 5/2018 | Matsuda ................. H02M 1/32 |
| 2018/0166984 A1 | * | 6/2018 | McIntosh ............... H02M 3/08 |
| 2018/0175730 A1 | * | 6/2018 | Leong ................... H02M 1/088 |
| 2018/0234011 A1 | * | 8/2018 | Muramatsu ............ B60Q 1/382 |
| 2018/0287481 A1 | * | 10/2018 | Liu ........................ H02M 1/083 |
| 2019/0115861 A1 | * | 4/2019 | Ogura ..................... H02P 27/08 |
| 2020/0006986 A1 | * | 1/2020 | Kim ........................ H02J 7/025 |

OTHER PUBLICATIONS

U.S. Appl. No. 16/543,867, filed Aug. 19, 2019, Cesaretti et al.
U.S. Appl. No. 10/483,846, filed Nov. 19, 2019, Allegrini et al.

* cited by examiner

*Primary Examiner* — Lincoln D Donovan
*Assistant Examiner* — Khareem E Almo
(74) *Attorney, Agent, or Firm* — Daly, Crowley, Mofford & Durkee, LLP

(57) ABSTRACT

A charge pump includes a first power source having a voltage $V_{REG}$ generated from a regulated and circuit-limiter supply, a second power source having a voltage $V_{BRG}$ and a top-off capacitor adapted to be charged to a voltage of the high of $V_{REG}$ or $V_{BRG}$ to a limit of a voltage clamp across the top-off capacitor.

20 Claims, 1 Drawing Sheet

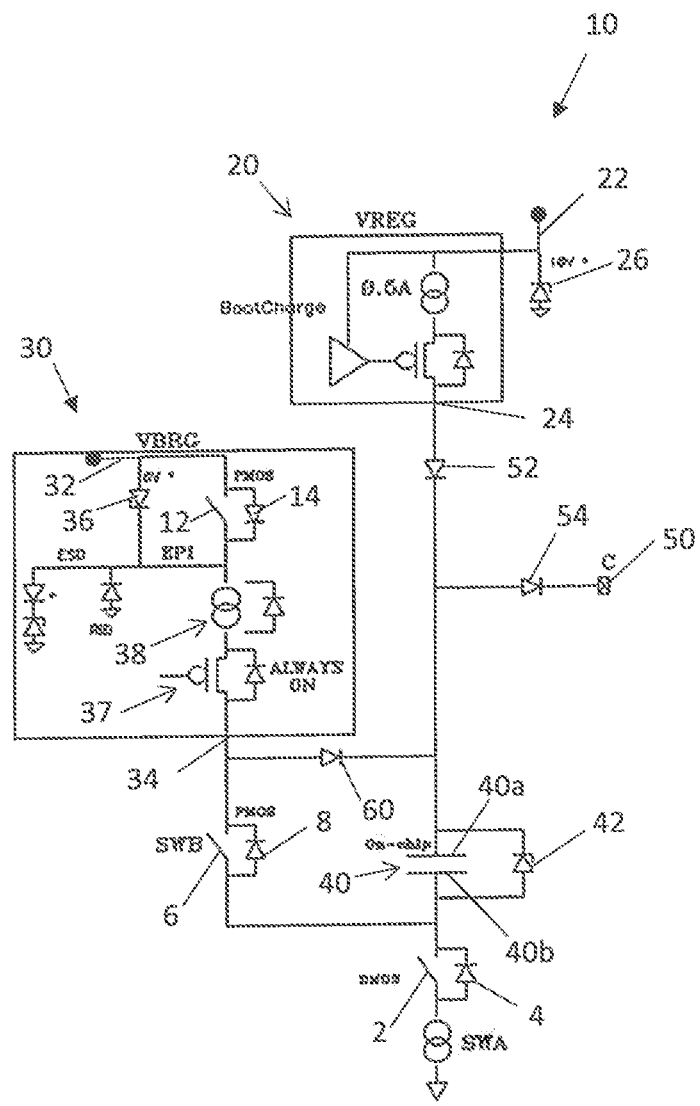

TOP-OFF CHARGE PUMP AND METHODS OF OPERATING SAME

CROSS-REFERENCE TO RELATED APPLICATIONS

Not Applicable.

STATEMENT REGARDING FEDERALLY SPONSORED RESEARCH

Not Applicable.

FIELD

This disclosure relates generally to charge pump circuits, and, more particularly, to methods and apparatus for providing a top-off charge pump circuit that also operates with a negative motor battery voltage.

BACKGROUND

As is known, in many electronic circuits, top-off charge pumps are used in a variety of applications to boost a voltage from an input voltage source to a higher level to meet system requirements. For example, a charge pump capacitor can be charged to a level to generate a gate drive signal at a level sufficiently higher than the high side switch source terminal in order to turn on the high side switch.

SUMMARY

The present disclosure provides a top-off charge pump circuit and associated methods wherein a charge pump capacitor is referenced to $V_{BRG}$, which maximizes the drive to the high-side driver in systems where $V_{BRG}$ is above $V_{BB}$ by a diode and the top-off charge pump (TOCP) would run off $V_{BRG}$. The circuit protects itself from negative going $V_{BRG}$ excursions. The second power supply including an always-on current mirror stops the floating current mirror from turning on and off at the charge pump frequency which is important as it maximizes speed.

In one aspect, a top-off charge pump circuit includes: a first power source having a voltage $V_{REG}$; a second power source having a voltage $V_{BRG}$; and a top-off capacitor adapted to be charged to a voltage of the high of $V_{REG}$ or $V_{BRG}$ to a limit of a voltage clamp across the top-off capacitor. The charge pump circuit may include one or more of the following features either independently or in combination to include: wherein the first voltage source comprises a regulated and circuit-limited supply; wherein the second voltage source comprises an always-on current mirror; wherein a top plate of the top-off capacitor is adapted to provide a voltage of $V_{REG}$ and $V_{BRG}$ up to a limit of $V_{BRG}$ and $V_{CHARGE}$, where $V_{CHARGE}$ is a clamp voltage across the top-off capacitor; wherein the top-off capacitor includes a top plate and a bottom plate, the top plate connected to the first power source through a first diode, the top plate also connected to an output of the charge pump through a second diode; a first switch having an input and an output, the input connected to the bottom plate of the top-off capacitor and the output connected to a reference potential; a second switch having an input and an output, the input connected to the output of the second power source and the input connected to the bottom plate of the top-off capacitor; or a diode having an anode connected to the output of the second power supply and a cathode connected to the top plate of the top-off capacitor.

In another aspect, a charge pump circuit includes: a first power source, having an output voltage $V_{REG}$; a second power source having an output voltage $V_{BRG}$; a top-off capacitor having a top plate and a bottom plate, the top plate connected to the first power source through a first diode and adapted to be charged to a voltage the high of $V_{REG}$ or $V_{BRG}$, the top plate also connected to an output of the charge pump through a second diode; a first switch having an input and an output, the input connected to the bottom plate of the top-off capacitor and the output connected to a reference potential; a Zener diode disposed in parallel with the top-off capacitor, a second switch having an input and an output, the input coupled to the output of the second power source and the input connected to the bottom plate of the top-off capacitor; and a diode having an anode connected to the output of the second power supply and a cathode connected to the top plate of the top-off capacitor. The charge pump circuit may include one or more of the following features either independently or in combination to include: wherein the first power source is a regulated and circuit-limited supply; wherein the second power source includes an always-on current mirror; a diode connected in parallel with the first switch; a diode connected in parallel with the second switch; wherein a top plate of the top-off capacitor is adapted to provide a voltage of $V_{REG}$ or $V_{BRG}$.

According to a further aspect, a method of operating a charge pump includes: providing a first power source having a voltage $V_{REG}$; providing a second power source having a voltage $V_{BRG}$; charging a top-off capacitor to the voltage level of $V_{REG}$; pumping the top-off capacitor to increase the voltage level at a top plate of the top-off capacitor by the voltage $V_{BRG}$; and providing at an output of the charge pump an output voltage having a voltage $V_{REG}$ and $V_{BRG}$. With such a technique, the top plate of the top-off capacitor is charged to a maximum of a clamp voltage, $V_{CLAMP}$, and then the bottom plate of the top-off capacitor is connected to $V_{BRG}$ such that the top plate of the top-off capacitor lifts to $V_{BRG}+V_{CLAMP}$ (max) to provide the output voltage. Features of the method may include one or more of the following, either individually or in combination, to include: wherein the output voltage is at least the higher of $V_{REG}$ or $V_{BRG}$; wherein the output voltage is limited by a voltage clamp across the top-off capacitor; or providing protection circuitry to protect the charge pump when the voltage $V_{BRG}$ goes negative.

BRIEF DESCRIPTION OF THE DRAWINGS

The foregoing features may be more fully understood from the following description of the drawing. The drawing aids in explaining and understanding the disclosed technology. Since it is often impractical or impossible to illustrate and describe every possible embodiment, the provided FIGURE depicts one or more illustrative embodiments. Accordingly, the FIGURE is not intended to limit the scope of the broad concepts, systems and techniques described herein. Like numbers in the FIGURE denote like elements.

The FIGURE is a circuit diagram depicting an embodiment of a top-off charge pump according to the disclosure.

DETAILED DESCRIPTION

The features and other details of the disclosure will now be more particularly described. It will be understood that any specific embodiments described herein are shown by way of illustration and not as limitations of the concepts, systems and techniques described herein. The principal features of this disclosure can be employed in various embodiments without departing from the scope of the concepts sought to be protected.

In many circuits, a top-off charge pump is required to replenish or "top-up" the charge on a capacitor to maintain a required voltage. The capacitor in gate drive systems can be used as a floating charge reference or "battery" to power a high-side driver on a microcircuit. The capacitor's voltage will decay over time if the driver takes static current, thus a top-off charge pump is used to keep the capacitor charged up and maintain a high-side on condition indefinitely.

Typically, microcircuits (also referred to as chips or a chip) have a diode from $V_{BRG}$, a motor's battery, to $V_{BB}$ (anode to $V_{BRG}$ side) such that when $V_{BRG}$ goes negative (reverse battery condition), the chip is protected. Reverse battery is usually limited to two diodes below ground (the diodes being the reverse body diodes of the MOSFETs that are being driven). The downside is that this reduces voltage headroom for circuits running off $V_{BB}$. It is also desirable for circuits operating in conjunction with a bridge, to run off the bridge supply voltage. In other systems, $V_{BB}$ and $V_{BRG}$ can be completely different supplies.

This disclosure uses two different power supplies in order to power a top-off charge pump. A first power supply providing a voltage, $V_{REG}$, is generated from a supply voltage $V_{BB}$ typically provided by a battery source. In some instances, the charge pump can be designed to operate with a battery voltage $V_{BB}$ of between approximately 4.5 volts and 50 volts. The first power supply is a regulated and current-limited supply which is available as long as $V_{BB}$ is available, regardless of $V_{BRG}$. The other power supply provides a voltage $V_{BRG}$ which can be provided and derived by a motor battery. As $V_{BRG}$ can potentially go negative, it is important that the circuit is protected in this condition. Furthermore, since $V_{BRG}$ can be a very high voltage, the circuit needs to be able to handle these voltages and react quickly. The advantages of this technique compared to similar techniques include the charge pump capacitor is referenced to $V_{BRG}$, which maximizes the drive to the high-side driver in systems where $V_{BRG}$ is above $V_{BB}$ by a diode and the top-off charge pump (TOCP) would run off $V_{BB}$. The circuit protects itself from negative going $V_{BRG}$ excursions. The second power supply including an always-on floating current mirror instead of a floating current mirror eliminating the need of turning on and off at the charge pump frequency which is important as it maximizes speed (a large floating epi can take time to charge and discharge).

Referring now to the single FIGURE, charge pump circuit 10 includes a first power source 20, having an output voltage $V_{REG}$, generated as a regulated and circuit-limited supply and a second power source 30 having an output voltage $V_{BRG}$. The first power source 20 at an output 24 provides a regulated voltage $V_{REG}$ typically in the 8-13 Volt range. The power source 20 can be configured to maintain the regulated voltage at a particular voltage as derived from the voltage of a battery $V_{BB}$ as provided to an input 22. Note a Zener diode 26 is provided as shown to provide a voltage clamp at the input 22. The second power source 30 at an output 34 provides a bridge voltage $V_{BRG}$ typically 5 Volts to 80 Volts or alternatively a negative voltage and is typically powered at an input 32 by a power source used to supply voltage to a motor or engine. Note a Zener diode 36 is provided as shown to provide a voltage clamp at the input 32. The charge pump circuit 10 further includes a top-off capacitor 40 adapted to be charged to a voltage the high of $V_{REG}$ or $V_{BRG}$ to a limit of a voltage clamp provided by a Zener diode 42 disposed in parallel with the top-off capacitor 40 as shown. The Zener diode 42 typically has a clamping voltage of 20 volts. A top plate 40a of top-off capacitor 40 is connected to an output 50 of the charge pump 10 through a diode 54 and connected to the power supply 20 through a diode 52 as shown. A bottom plate 40b of top-off capacitor 40 is connected to a switch 2 having a diode 4 disposed in parallel with the switch 2 as shown. The bottom plate 40b of top-off capacitor 40 is also connected to a switch 6 having a diode 8 disposed in parallel with the switch 6 as shown. The other side of switch 6 is connected to the output 34 of power supply 30. A diode 60 has an anode or input connected to the power supply 30 and a cathode or output connected to the top plate 40a of the top-off capacitor 40 as shown.

The power supply 30 is provided with a current limiter 38 and an always on switch 37 and can be any voltage, for example, 5 Volts to 80 Volts or alternatively a negative voltage and is typically powered by a power source used to supply voltage to a motor or engine. The power supply 20 is provided to maintain here typically 10 volts at the output 50 to drive an external gate and is used to charge the on-chip top-off capacitor 40. As mentioned above a clamp 42 is also provided in parallel with the on-chip top-off capacitor 40 to protect the top-off capacitor 40.

In operation, when switch 2 is closed or turned on, and the bottom plate 40b is connected to ground and the on-chip top-off capacitor 40 will charge up to the voltage $V_{REG}$, (minus any incidental voltage drop across diode 52) for example 10 volts, and the capacitor will maintain 10 volts across the capacitor when switch 2 is opened. In the pump phase, to elevate the capacitor plates of the on-chip capacitor 40, switch 6 is closed and the voltage $V_{BRG}$ is applied to the bottom plate 40b of the top-off capacitor 40, such that voltage on the top plate 40a of the capacitor 40 will be $V_{BRG}$ plus $V_{REG}$ (here 10 volts in our example) to provide an output voltage at the output 50 of $V_{BRG}$ plus $V_{REG}$. The output voltage of the charge pump 10 would be $V_{BRG}$ plus $V_{REG}$ and ensures the output voltage is greater than $V_{BRG}$. It should be noted when $V_{BRG}$ is higher than $V_{REG}$, for example by 20 or 30 volts, this circuit will charge from $V_{BRG}$ instead of $V_{REG}$ since travelling through diode 60 will become the preferential path.

Since $V_{BRG}$ can be attached to a motor battery, $V_{BRG}$ can go negative, for example −5 volts, so PMOS low-voltage switch 12 is included as shown to protect the circuit if $V_{BRG}$ was to go negative. Switch 12 includes a diode 14 disposed in parallel with the switch 12 as shown. The diode has its anode to $V_{BRG}$, so the circuit is protected from negative hits (an external ESD structure can provide an ESD current path). For positive $V_{BRG}$ the diode conducts but passive hold-offs keep the circuit turned off until commanded on. When commanded on, the LV PMOS gate is pulled low, turning the PMOS into a switch, and clamps to a Zener diode 36 (cathode on source of PMOS, anode on gate). It should be noted it is desirable not to use high voltage devices since they are large and expensive, so here a low-voltage device is used with a clamp provided to protect the gate source and a diode across it from the other direction to protect it so a so a high voltage switch is not required. It should be appreciated, for positive $V_{BRG}$, the diode 14 is connected such that an ESD_TOCP node (or "EPI" node labelled in the drawing) charges up. The switch is turned on by pulling current to ground from this node. It clamps on a Zener (not shown) in order to provide a Vsg voltage to turn the switch 12 on. A resistor (not shown) in parallel with the Zener is a passive pull-off to ensure the gate-source is off with no power applied. When $V_BRO$ goes negative, the PMOS switch 12 is off and its body diode blocks.

As described above, in operation of the charge pump 10, in one phase (CHARGE), the top-off capacitor 40 is charged to the higher of $V_{REG}$ or $V_{BRG}$, to a limit of a voltage clamp 42 across the capacitor 40 to a voltage across the capacitor $V_{CHARGE}$. In a second phase (PUMP), the bottom of the capacitor 40 is lifted to $V_{BRG}$, while the top of the capacitor 40 will be sitting at approximately $V_{BRG}+V_{CHARGE}$. This provides the required voltage at the output 50 with which to supply a high-side MOSFET as needed.

The power source 30 includes a floating current mirror 38 implemented in series with a switch 37, which limits the current out of the power source 30 in both charge and pump phases. This mirror can use logic-level devices and the output mirror device uses switch 37 as a high-voltage device for protection. The mirror 38 is always on (as long as the TOCP is on) which speeds up operation; a large floating current mirror can take time to charge and discharge. Switch 37 is closed to activate the power source 30.

Note that at very high $V_{BRG}$ levels, the capacitor 40 floats relative to $V_{BRG}$ since the bottom plate 40b does not go to ground when charging. The capacitor 40 is charged from $V_{BRG}$ and not $V_{REG}$. This is important as we do not want the capacitor 40 to be moving from 0V all the way to $V_{BRG}$ (which can be as high as 80V) at the clock frequency (a non-overlapping clock determines charge and pump phases). For this to work correctly, the current limited $V_{BRG}$ path current must be greater than the current limit which is in line with the charge switch 2. Note the LV PMOS switch 12 blocks negative $V_{BRG}$ voltages, and the always-on floating current mirror 38 limits the current at the output 34 of the power source 30. It should be appreciated if $V_{BRG}$ is too low, $V_{REG}$ will be high enough to guarantee enough voltage across the top-off capacitor 40. It should also be appreciated the advantage of the floating current mirror referenced to $V_{BRG}$ is that it limits the current so that we do not get excess current from the power source 30.

As noted above, the advantages of the described technique compared to similar techniques include the charge pump capacitor is referenced to $V_{BRG}$, which maximizes the drive to the high-side driver in systems where $V_{BRG}$ is above $V_{BB}$ by a diode and the top-off charge pump (TOCP) would run off $V_{BB}$. The circuit protects itself from negative going $V_{BRG}$ excursions. The second power supply including an always-on current mirror stops the floating current mirror from turning on and off at the charge pump frequency which is important as it maximizes speed (a large floating epi can take time to charge and discharge).

As described above and will be appreciated by one of skill in the art, embodiments of the disclosure herein may be configured as a system, method, or combination thereof. Accordingly, embodiments of the present disclosure may be comprised of various means including hardware, software, firmware or any combination thereof. Furthermore, embodiments of the present disclosure may take the form of a computer program product on a computer-readable storage medium having computer readable program instructions (e.g., computer software) embodied in the storage medium. Any suitable non-transitory computer-readable storage medium may be utilized.

Having described preferred embodiments, it will now become apparent to one of ordinary skill in the art that other embodiments incorporating their concepts may be used. For example, it will also be appreciated that while the circuits and techniques are shown and described herein in connection with analog circuitry, alternatively digital circuitry and techniques can be used for some or all of the circuit functions. Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims. It is felt therefore that these embodiments should not be limited to disclosed embodiments, but rather should be limited only by the spirit and scope of the appended claims.

What is claimed is:

1. A charge pump circuit, comprising:
    a first power source having a voltage $V_{REG}$;
    a second power source having a voltage $V_{BRG}$; and
    a top-off capacitor adapted to be charged to a voltage of the high of $V_{REG}$ or $V_{BRG}$ to a limit of a voltage clamp across the top-off capacitors;
    wherein the second voltage source comprises an always-on current mirror.

2. The charge pump circuit of claim 1 comprising a voltage clamp disposed in parallel with the top-off capacitor.

3. The charge pump circuit of claim 1 wherein the first voltage source comprises a regulated and circuit-limited supply.

4. The charge pump circuit of claim 1 comprising a Zener diode to provide a voltage clamp at an input of the first power supply.

5. The charge pump circuit of claim 1 wherein a top plate of the top-off capacitor is adapted to provide a voltage of $V_{REG}$ and $V_{BRG}$ up to a limit of $V_{BRG}$ and $V_{CHARGE}$, where $V_{CHARGE}$ is a clamp voltage across the top-off capacitor.

6. The charge pump circuit of claim 1 wherein the top-off capacitor includes a top plate and a bottom plate, the top plate connected to the first power source through a first diode, the top plate also connected to an output of the charge pump through a second diode.

7. The charge pump circuit of claim 6 comprising a first switch having an input and an output, the input connected to the bottom plate of the top-off capacitor and the output connected to a reference potential.

8. The charge pump circuit of claim 7 comprising a second switch having an input and an output, the input connected to the output of the second power source and the input connected to the bottom plate of the top-off capacitor.

9. The charge pump circuit of claim 8 comprising a diode having an anode connected to the output of the second power supply and a cathode connected to the top plate of the top-off capacitor.

10. A charge pump circuit comprising:
    a first power source, having an output voltage $V_{REG}$;
    a second power source having an output voltage $V_{BRG}$;
    a top-off capacitor having a top plate and a bottom plate, the top plate connected to the first power source through a first diode and adapted to be charged to a voltage the high of $V_{REG}$ or $V_{BRG}$, the top plate also connected to an output of the charge pump through a second diode;
    a first switch having an input and an output, the input connected to the bottom plate of the top-off capacitor and the output connected to a reference potential;
    a Zener diode disposed in parallel with the top-off capacitor;

a second switch having an input and an output, the input coupled to the output of the second power source and the input connected to the bottom plate of the top-off capacitor; and a diode having an anode connected to the output of the second power supply and a cathode connected to the top plate of the top-off capacitor;

wherein the second voltage source comprises an always-on current mirror.

11. The charge pump circuit of claim 10 wherein the first power source is a regulated and circuit-limited supply.

12. The charge pump circuit of claim 10 comprising a Zener diode to provide a voltage clamp at an input of the first power supply.

13. The charge pump circuit of claim 10 comprising a diode connected in parallel with the first switch.

14. The charge pump circuit of claim 10 comprising a diode connected in parallel with the second switch.

15. The charge pump circuit of claim 10 wherein a top plate of the top-off capacitor is adapted to provide a voltage of $V_{REG}$ and $V_{BRG}$.

16. A method of operating a charge pump comprising:
providing a first power source having a voltage $V_{REG}$;
providing a second power source having a voltage $V_{BRG}$, the second voltage source comprising an always-on current mirror;
charging a top-off capacitor to the voltage level of $V_{REG}$;
pumping the top-off capacitor to increase the voltage level at a top plate of the top-off capacitor by the voltage $V_{BRG}$; and
providing at an output of the charge pump an output voltage having a voltage $V_{REG}$ and $V_{BRG}$.

17. The method of claim 16 wherein the output voltage is at least the higher of $V_{REG}$ or $V_{BRG}$.

18. The method of claim 17 wherein the output voltage is limited by a voltage clamp across the top-off capacitor.

19. The method of claim 16 comprising providing protection circuitry to protect the charge pump when the voltage $V_{BRG}$ goes negative.

20. The method of claim 16 comprising providing a Zener diode to provide a voltage clamp at an input of the first power supply.

* * * * *

UNITED STATES PATENT AND TRADEMARK OFFICE
CERTIFICATE OF CORRECTION

PATENT NO. : 10,811,961 B1  
APPLICATION NO. : 16/564287  
DATED : October 20, 2020  
INVENTOR(S) : Thomas Ross et al.

Page 1 of 1

It is certified that error appears in the above-identified patent and that said Letters Patent is hereby corrected as shown below:

On the Title Page

Item (57) Abstract delete "high" and replace with --higher--.

In the Specification

Column 1, Line 47 delete "high" and replace with --higher--.

Column 3, Line 48 delete "eliminating" and replace with --eliminates--.

Column 4, Line 1 delete "high," and replace with --higher,--.

Column 4, Line 60 delete "so a so" and replace with --so a--.

Column 5, Line 2 delete "$V_BRO$" and replace with --$V_{BRG}$--.

In the Claims

Column 6, Line 20 delete "high" and replace with --higher--.

Column 6, Line 21 delete "capacitors" and replace with --capacitor--.

Column 6, Line 60 delete "high" and replace with --higher--.

Signed and Sealed this  
Third Day of August, 2021

Drew Hirshfeld  
*Performing the Functions and Duties of the*  
*Under Secretary of Commerce for Intellectual Property and*  
*Director of the United States Patent and Trademark Office*